J. R. Harrington.
Carpet Lining.
No. 2416.
Reissued Dec. 11, 1866.
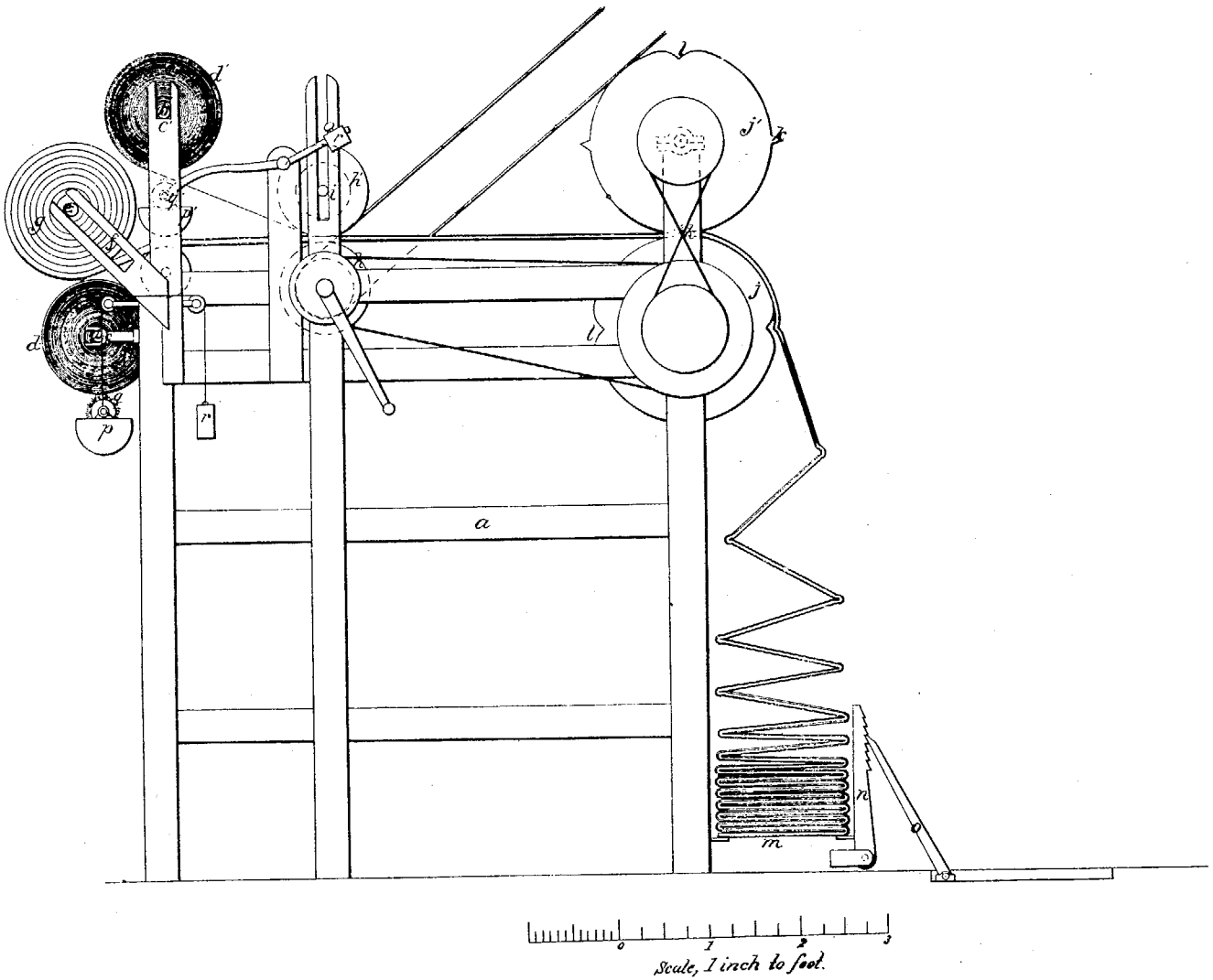

United States Patent Office.

IMPROVED MACHINE FOR MAKING CARPET LINING.

GEORGE W. CHIPMAN, OF BOSTON, MASSACHUSETTS, ASSIGNEE BY MESNE ASSIGNMENTS OF JOHN R. HARRINGTON.

*Letters Patent No.* 14,585, *dated April* 1, 1856; *reissue No.* 2,416, *dated December* 11, 1866.

The Schedule referred to in these Letters Patent and making part of the same.

TO ALL WHOM IT MAY CONCERN:

Be it known that JOHN R. HARRINGTON, of Dayton, Montgomery county, Ohio, has invented a new and useful improvement in the manufacture of Carpet Lining, of which the following is a full, clear, and exact description, reference being had to the annexed drawing, making part of this specification.

The object of the invention is to manufacture with economy and despatch a class of carpet lining, consisting of a lap or layer of cotton batting, wadding, or flock, interposed between two long strips of stout paper. This lining is found to possess in a remarkable degree the advantages of uniform and even substance and surface, permanent elasticity, non-conduction of all cold, heat, and sound, easy appliance and removal, preservation of the carpet beneath which it is spread, and a merchantable form.

This invention consists primarily in forming a carpet lining by bringing a sheet or sheets of paper, and a sheet or sheets of batting, or soft fibrous material, into contact, and so that their contiguous surfaces shall adhere, and forming the adhering layers into a long or continuous wadding or lining of uniform width; also, in combining with a roll or rolls upon which the sheet or sheets of paper are wound, feed and presser rolls, operating in such manner that the paper shall be fed from such paper rolls, by and between the presser rolls, together with and so as to compress against the paper a continuous layer of batting, or soft fibrous elastic material, the paper and batting being, by the compression and progression of the feed rolls, formed into a long, continuous, soft-lined wadding; also, in combining with such paper roll or rolls and feed and compressing rolls a paste or cement-applying apparatus, by which each surface of paper to be laid against the batting has cement applied to it before entering between the feed rolls; also, in combining with a wadding-forming apparatus the creasing or fold-forming rolls, for effecting the delivery of the wadding in folds of uniform width; also, in combination with a wadding and fold-forming apparatus a box or platform into or upon which the wadding is automatically delivered, and from which it is removed by letting down a fall in front.

In the accompanying drawing, in which the machine is represented by a side elevation, *a* denotes the frame; *b b'* horizontal rolls hung at different elevations in bearings, *c c'*. Around each roll, *b b'*, is wound a roll of stout paper, *d d'*. *e* denotes a horizontal roll resting in oblique slots, *f*, so as to revolve at an elevation intermediate between the rolls *b b'*. Around this roll, *e*, is wound a fibrous bat or lap, *g*. The obliquely-slotted bearing of the roll, *e*, permits its advance as the lap in the course of operation becomes unwound, the parts being so arranged as to enable the roll of wadding to rest at all times upon the lower roll of paper, and to be supported by and drawn onward with such paper. *h h'* are two feed and presser rolls, the upper one of which occupies vertical slotted bearings, *i*, in the frame, and rests upon the upper surface of the paper. To the shaft of the roller, *h*, a winch or driving-pulley may be applied to operate the machine. *j j'* are two rollers placed somewhat in advance of and with their parts most nearly in contact about on a level with corresponding parts of the rollers *h h'*. These rollers are identical in form, and each of them has a ridge or ridges, *k*, and a groove or grooves, *l*, as represented, the ridge of each roller meshing into the corresponding groove of the other. (The circumference of each roller, including the indentations and projections, may measure just two yards, so as to measure precisely half a yard from each projection to the next indentation on the same roller.) These rollers, called "creasing rollers," in connection with a platform or box placed some distance immediately under the delivery of the said rollers, serve to deposit the material in uniform folds of uniform width, the wadding, without any further manipulation, being thus accurately measured off and conveniently folded for baling. From the nature of the material, this peculiar mode of folding is desirable, because the paper enclosures not being of a nature susceptible of stretching, a continuous folding of the material in one direction, besides preventing the possibility of the above-described method of measurement by folds, would result in an injurious wrinkling of one of the paper layers that would interfere with the smooth disposal of the lining upon a floor. *m* is a platform which receives the lining from the creasing rollers, *n* is a temporary front, which, being held up by a pawl, *o*, during the folding of the stuff, can be let down to permit the removal of the piece for baling. The two creasing rollers are geared together in such a way as to insure their equal action and rotation. *p p'* are paste or cement-containing troughs, in which are hung cylindrical rotary brushes, *q q'*. These brushes are, by means of counter-balances, *r*, or otherwise, made to press and revolve against the inner surfaces of the paper, so as to apply thereto the cement by which the outer surfaces of the filling and the inner surfaces of the paper are caused to adhere as they are pressed together. When the machine is intended to manufacture a lining or wadding without causing the intermediate layer of cotton or other filling to adhere to the outside sheets of paper by means of cement, (the fibre of the cotton being made to adhere to the rough or nappy surface of the paper by pressure as they are passed through the rolls *h h'*,) then the cementing apparatus may be dispensed with. Rolls of paper and wadding being placed on their respective bearings, as described, and the troughs being properly supplied with adhesive fluid, the ends of the paper, with the wadding between them, are introduced between the presser rolls, whence, passing onward, they are carried between the creasing rollers, and thence descend in proper folds, as before explained, on to the platform. When a desirable number of folds has accumulated upon the platform, the piece is separated at the proper crease, and may then be removed and baled. It will be obvious that the lining may be formed with only one sheet or surface of paper, and with either one or several layers of batting, though the formation described is considered the preferable one.

What is claimed is the process of making a carpet lining by progressively bringing into contact a sheet or sheets of stout paper and a sheet or sheets of batting, or soft fibrous material, so that upon contact of the contiguous surfaces they shall be caused to adhere together, substantially as described.

Also, in combining with a roll or rolls, upon which the sheet or sheets of paper are wound, feed and presser rollers, operating to compress together and feed the paper and batting, substantially as set forth.

Also, in combination with the paper roll or rolls, and feeding and compressing rolls, a paste or cement-applying mechanism, operating substantially as described.

Also, in combination with a wadding-forming apparatus, creasing or fold-forming rolls, operating as and for the purpose substantially as set forth.

Also, in combination with such fold-forming mechanism, the box or platform into which the wadding is delivered in folds, and from which it is removed for baling by letting down the fall, substantially as described.

GEO. W. CHIPMAN.

Witnesses:
F. GOULD,
L. H. LATIMER.